W. M. BOON.
Fertilizer-Distributor.

No. 199,022. Patented Jan. 8, 1878.

WITNESSES:
E. Wolff.
J. H. Scarborough.

INVENTOR:
W. M. Boon.
BY Munn & Co.
ATTORNEYS.

UNITED STATES PATENT OFFICE.

WILLIAM M. BOON, OF PERRY, GEORGIA.

IMPROVEMENT IN FERTILIZER-DISTRIBUTERS.

Specification forming part of Letters Patent No. 199,022, dated January 8, 1878; application filed October 24, 1877.

*To all whom it may concern:*

Figure 1:
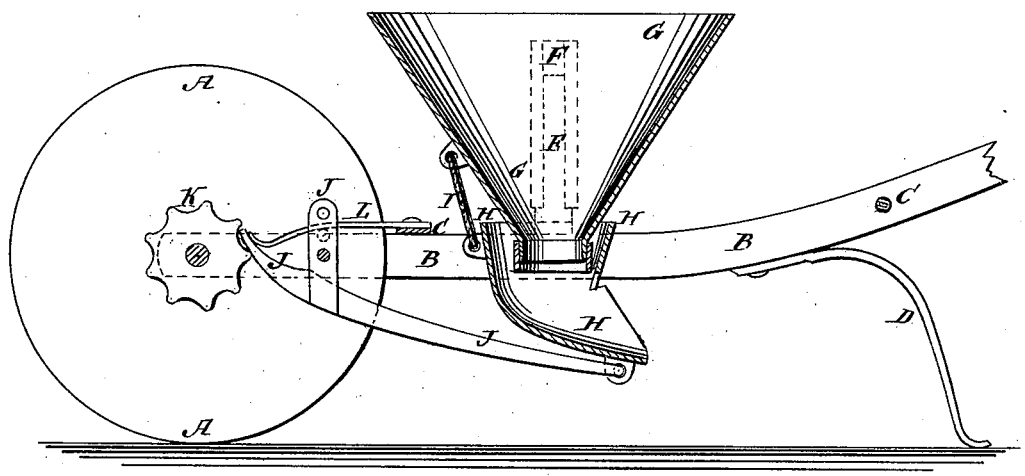
Figure 2:
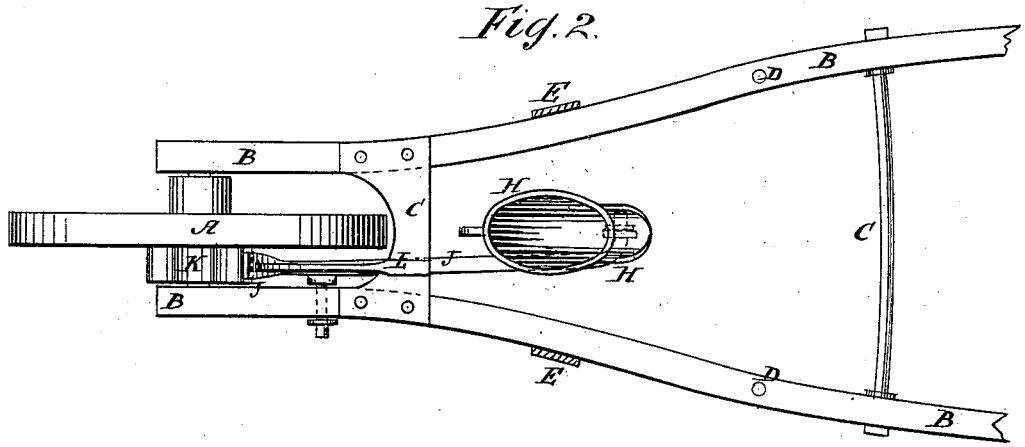

Be it known that I, WILLIAM M. BOON, of Perry, in the county of Houston and State of Georgia, have invented a new and useful Improvement in Fertilizer-Distributers, of which the following is a specification:

Figure 1 is a detail vertical section of my improved machine. Fig. 2 is a top view of the same, the hopper being removed.

Similar letters of reference indicate corresponding parts.

The object of this invention is to furnish an improved machine for distributing guano and other fine fertilizers, which shall be simple in construction and effective in use, may be adjusted to distribute the fertilizer faster or slower, and which shall be so constructed that it may be used by hand.

The invention will first be described in connection with the drawing, and then pointed out in claim.

A represents a wheel, the journals of which revolve in bearings formed in or attached to the forward ends of the side bars B. The bars B are connected by cross-bars C, are provided with feet D, and project to serve as handles for operating the machine, the wheel A and frame B C D being similar to the wheel and frame of a wheelbarrow. To the bars B, a little in the rear of the wheel A, are attached upwardly-projecting bars E, which receive downwardly-projecting socket-bars F, attached to the upper part of the sides of the hopper G. The hopper G is made in the form of an oval funnel, and its lower end enters the mouth of a shoe, H, the upper or rear end of which is connected with the hopper G by a hinge-strap, cord, or chain, I. To the under side of the lower or spout-shaped end of the shoe H is hinged the end of the long rear arm of the three-armed lever J. The upper arm of the lever J has a number of holes or a slot formed in it, to receive the bolt by which it is pivoted adjustably to the forward part of one of the bars B.

The end of the forward arm of the lever J has a foot formed upon it, which rests upon the face of the scalloped wheel K, attached to the side of the wheel A, or to its hub or journal, so that as the machine is pushed forward the shoe H will be agitated and the fertilizer shaken out. The end of the lever J is held against the wheel K by a spring, L, which rests upon it, and is attached to the forward cross-bar C of the frame B C D.

Having thus described my invention, I claim as new and desire to secure by Letters Patent—

In a fertilizer-distributer, the combination of the hopper G, the pivoted shaking-shoe H, the curved lever J, having an arm pivoted to side bar B, the scalloped wheel K, and spring L, all arranged to operate as shown and described.

WILLIAM MINCHEW BOON.

Witnesses:
T. M. KILLON,
C. M. DU PREE.